United States Patent [19]

Lombardo et al.

[11] Patent Number: 5,230,687

[45] Date of Patent: Jul. 27, 1993

[54] SEMI-AUTOMATIC MACHINE FOR FOLDING AND GLUING PAPER COVERING BORDERS FOR CARDBOARD AND OTHER MATERIALS

[75] Inventors: Paolo Lombardo, Scandicci; Maresco Magnolfi, Barberino di Mugello, both of Italy

[73] Assignee: Universal Ribo S.r.l., Florence, Italy

[21] Appl. No.: 898,815

[22] Filed: Jun. 15, 1992

[30] Foreign Application Priority Data

Jun. 17, 1991 [IT] Italy ............................. FI91A 000145

[51] Int. Cl.⁵ ........................ B31B 1/26; B65H 45/16
[52] U.S. Cl. .................................. 493/177; 156/479; 493/127; 493/386; 493/389
[58] Field of Search .............. 493/379, 386, 389, 406, 493/436, 442, 454, 349, 419-421, 438, 125, 126, 127, 147, 177, 142, 144; 156/477.1, 479, 480

[56] References Cited

U.S. PATENT DOCUMENTS

| | | | |
|---|---|---|---|
| 828,471 | 8/1906 | Garrett | 493/389 |
| 1,042,577 | 10/1912 | Lipscomb | 493/386 |
| 1,046,658 | 12/1912 | Schoettle | 493/386 |
| 1,794,521 | 3/1931 | Kirchhofer | 156/479 |
| 2,621,142 | 12/1952 | Wetherell | 493/386 |
| 2,667,909 | 2/1954 | Stobb | 156/479 |
| 4,248,657 | 2/1981 | Henry | 156/479 |

*Primary Examiner*—Bruce M. Kisliuk
*Assistant Examiner*—Jack Lavinder
*Attorney, Agent, or Firm*—McGlew and Tuttle

[57] ABSTRACT

The machine is used to fold and glue paper covering borders onto cardboard or other materials and includes a folding element (9) with a symmetrical row of bristles for folding and gluing the borders passing through in both directions and capable of acting alternately in the two opposite directions; and, on both sides of the mechanism, symmetrical receiving, pressing and advancing elements (1, 3, 5, 7; 21, 25, 27), between which the semi-finished article is fed in a first direction of advance (fA) which is orthogonal to one side of the semi-finished article, and which are capable of operating alternately in two opposite directions (fA, fB) to carry out the folding of the two parallel and opposite borders of the article; a single article may be inserted twice in orientations orthogonal to each other for the folding of the four borders.

11 Claims, 4 Drawing Sheets

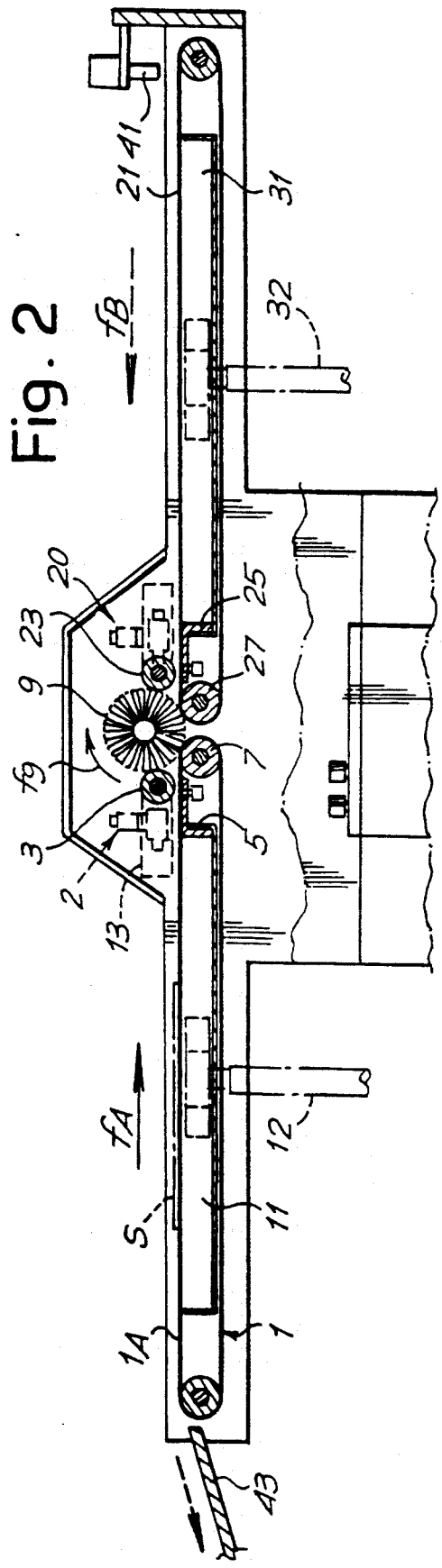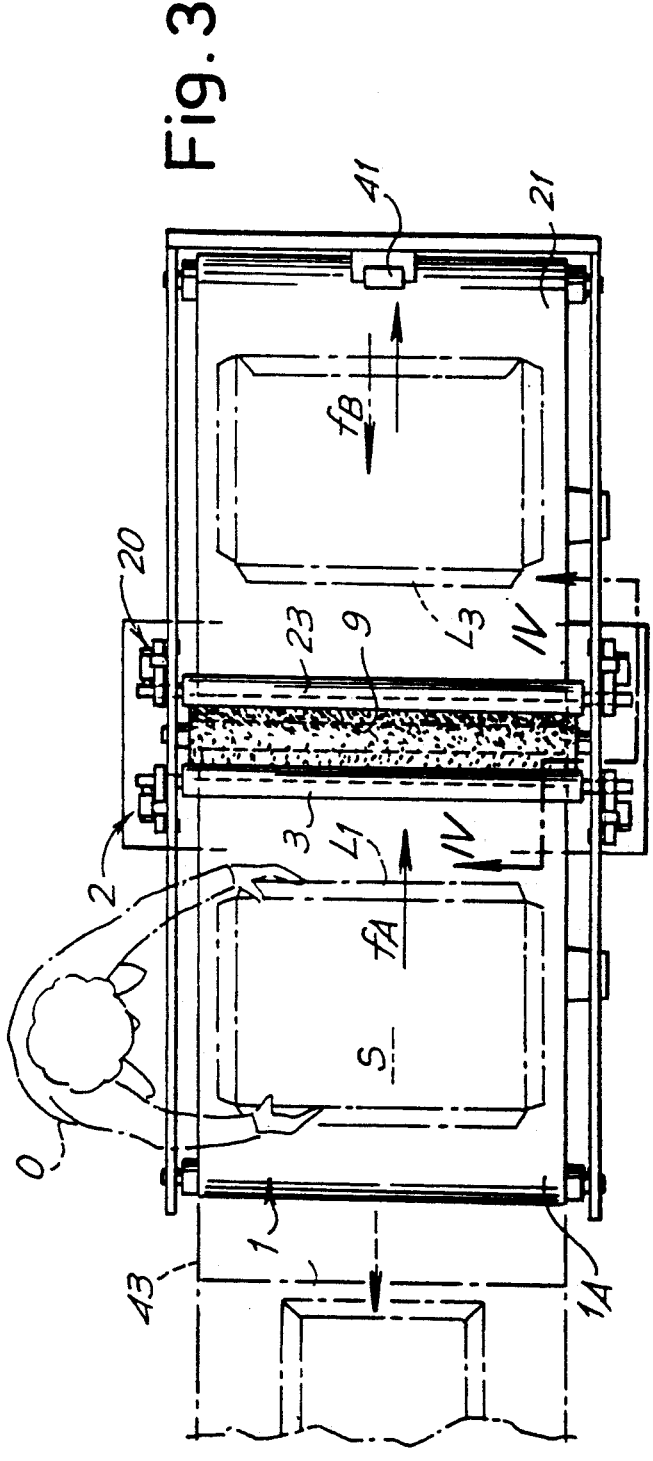

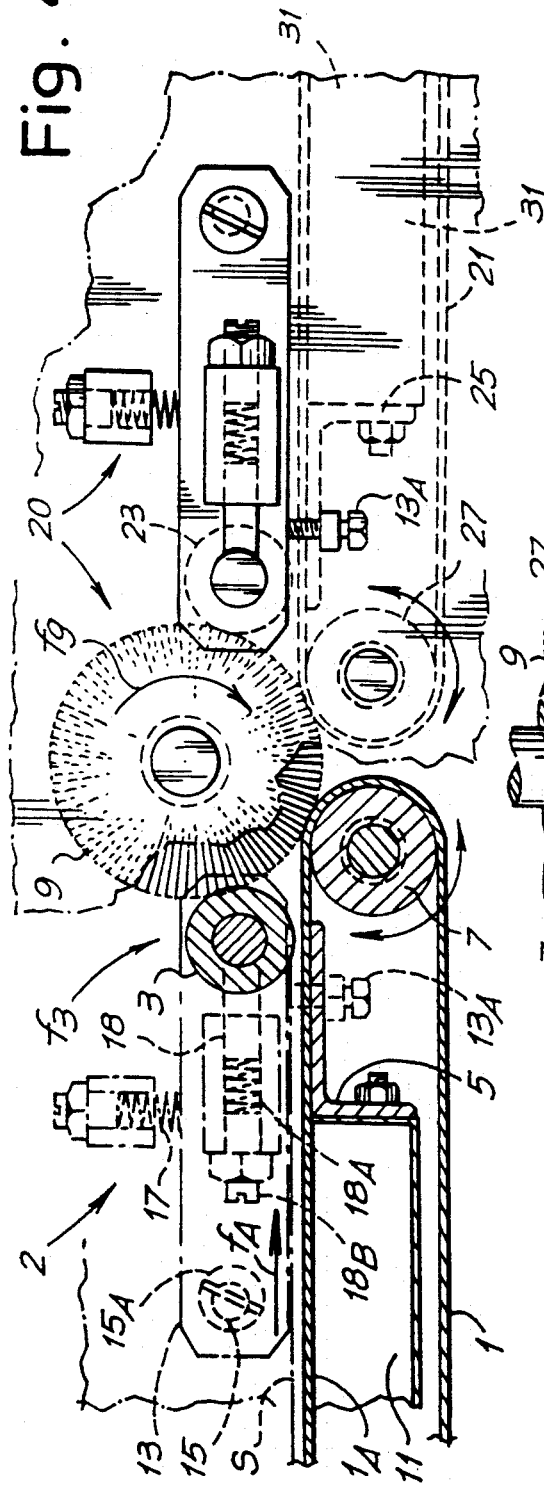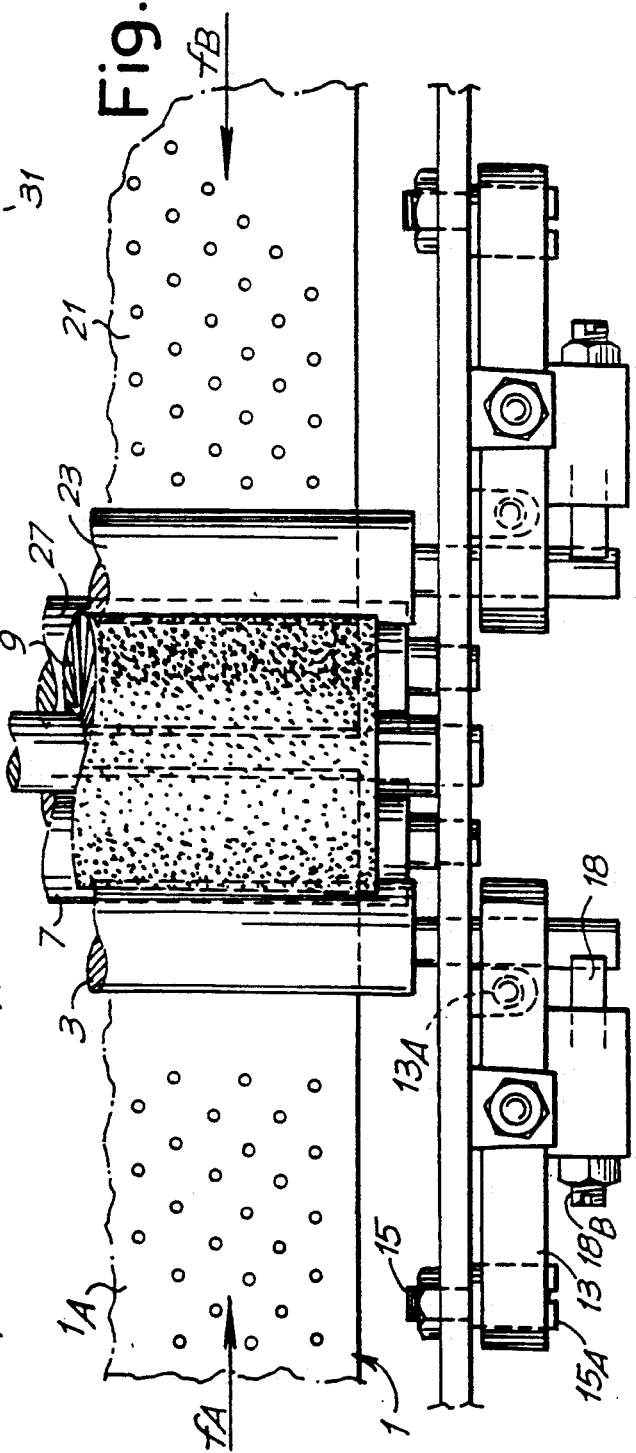

SEMI-AUTOMATIC MACHINE FOR FOLDING AND GLUING PAPER COVERING BORDERS FOR CARDBOARD AND OTHER MATERIALS

FIELD OF THE INVENTION

The present invention is used to make articles of the archive file type, consisting of a rectangular sheet of rigid cardboard having a thickness of a few millimeters or fractions of millimeters and covered externally with paper bonded to the cardboard with glue. The paper is larger than the cardboard by a certain amount on each side. The borders of the paper, projecting beyond the cardboard, have to be folded back on said cardboard so that the article has all its sides and corners properly finished with the covering. Subsequently, in the archive files, two central folds are made to form the file into the shape of a book.

SUMMARY AND OBJECTS OF THE PRESENT INVENTION

The object of the invention is the provision of a semi-automatic machine which enables the above operation to be performed accurately and rapidly with limited and simple manual intervention.

The machine substantially comprises: a folding element with a symmetrical row of bristles for folding and gluing the borders passing through in both directions and capable of acting alternately in the two opposite directions; and, on both sides of the element, symmetrical receiving, pressing and advancing mechanisms, between which the semi-finished article is fed in a first direction of advance which is orthogonal to one side of the semi-finished article, and which are capable of operating alternately in two opposite directions to carry out the folding of the two parallel and opposite borders of the article. A single article may be inserted twice in orientations orthogonal to each other, in order thereby to obtain the folding of the four borders.

The folding element is in practice a rotor element with radial bristles capable of rotating in two opposite directions. Alternatively, a double row of bristles may be provided, each having bristles fixed and inclined downward and facing the direction of arrival of the article.

The machine may comprise: a first mechanism with a conveyor and receiving and pressing elements between which the semi-finished article is fed; downstream of this first mechanism, a folding element, which may be a bristle rotor; and on the opposite said first mechanism, with respect to the folding element, a second mechanism symmetrical with the preceding one, with a conveyor and receiving and pressing elements operating in the opposite direction with the same folding element; each of the mechanisms being capable of folding and pressing the two opposite borders of the article passing through it in two opposite directions under the folding element.

The receiving, pressing and advancing elements of each mechanism may comprise: a bearing surface on which a conveyor belt runs, and a pressing and advancing cylinder elastically stressed against the surface, free to rotate and combined with means of adjusting its minimum distance from the bearing surface. Each of the pressing and advancing cylinders may be fitted with adjustable braking means and is carried by oscillating arms fitted with adjustment means; the pressing cylinder may thus be moved nearer to or further from the bristle rotor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 2 and 3 show a vertical section, orthogonal to the axes of rotation, and a plan view;
FIG. 4 shows an enlarged detail;
FIG. 5 shows a partial plan view.

DETAILED DESCRIPTION OF THE PREFERRED EMBODIMENTS

Figure 1:
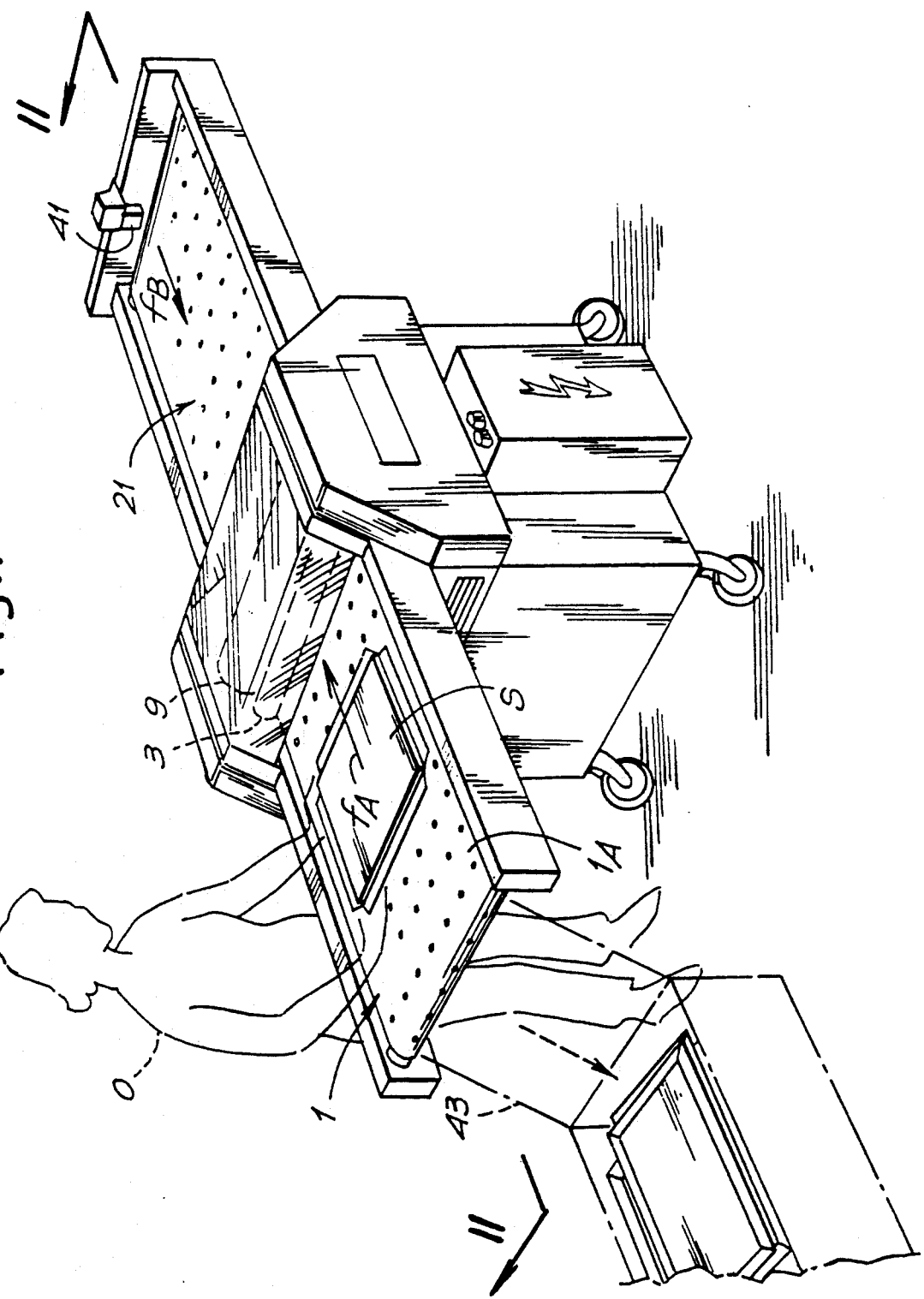
FIG. 1 shows a perspective view of the machine.

According to the drawing, 1A indicates a surface for supporting and feeding the article, formed by the upper strand of a conveyor belt 1; this conveyor belt 1, 1A is capable of feeding the article in the direction fA to a folding and pressing mechanism 2 contiguous to the surface 1A. In this mechanism 2 there is provided a pressing and advancing cylinder 3 and a bearing wall 5, placed close together with one above the other, the strand 1A of the conveyor belt 1 running over the wall 5. The semi-finished article, moved by the surface 1A in the direction of the arrow fA, is fed between the two elements 3 and 5, which are adjusted to provide a minimum and adjustable gap between them, slightly smaller than the sum of the thicknesses of the cardboard S and of the paper to be attached, whose borders L are to be folded. A return roller 7 of the conveyor belt 1 is provided immediately downstream of the pair of elements 3 and 5. This roller 7 is followed by a bristle-type folding element made in the form of a rotary brush 9, whose lower profile is slightly lower than the surface of the conveyor belt 1 in the area of return on the roller 7; the bristles of the brush 9 may bend slightly to a greater or lesser extent during the rotation of the brush 9 in the direction f9. The brush 9 also touches the cylinder 3, causing it to rotate.

The conveyor belt 1 is initially driven in the direction of the arrow fA to advance the article to be processed. The article being the cardboard S and the paper stuck to it with borders L1, L2, L3 and L4 projecting. The article is positioned by the operator on the surface 1A.

To ensure the advancing, the conveyor belt 1 may in certain cases be air-permeable and a suction box 11, which may be solidly fixed to the wall 5 extended at right-angles, is provided under the upper moving strand 1A of the conveyor. A suction duct 12 is then connected to the box 11.

In order to provide the compressive stressing of the cylinder 3 toward the belt 1, 1A running on the wall 5, and the adjustment of the minimum distance between the belt 1, 1A and the cylinder 3, the cylinder is carried by two arms 13 pivoted on pins 15 mounted on the fixed structure. The arms 13 are stressed by biasing means including suitably adjustable springs 17 acting in the direction f3. The cylinder 3 is mounted so that it rotates idly on the arms 13, and is braked to a greater or lesser extent by the friction of sliding blocks 18 which act on the cylinder itself or on its pivots and are pushed by springs 18A which may be adjusted with screw rods 18B. The minimum distance between the cylinder 3 and the belt 1, 1A is adjusted by adjustable screw stops a messing adjustment means 13A on the structure carrying the wall 5 and the return roller 7 of the belt 1. Each pin 15 may be adjustable by a bristle position adjustment means of an eccentric system 15A or in another suitable way, in order to vary the position of the cylinder 3 with respect to the brush periphery.

In this way the border L1 of the paper is advanced underneath the cylinder 3 without hindrance. The cardboard S is straightened and its front edge bears against the cylinder 3 as a result of the advance provided by the belt 1, 1A in the direction fA, and is oriented exactly parallel to said cylinder 3 (which may slow down or stop) before being drawn by the belt 1 under the cylinder 3 and toward the rotating brush 9. The rotating brush 9 touching the cylinder 3 tends to make it rotate, and interacting with the belt 1, 1A along the roller 7, lifts the front border L1 of the paper, and folds it about the edge of the cardboard, gently laying it on the upper surface of said cardboard. The elements 3 and 5 press the paper and cardboard, providing an even gluing attachment.

Immediately downstream of the brush 9 (with respect to the direction fA) there is provided a second receiving and motion-reversing mechanism 20, symmetrical with the assembly 1, 7 with respect to the brush 9. The second mechanism comprises a continuous conveyor belt 21, a pair of elements 23 and 25 symmetrical with the elements 3 and 5, a return roller 27 of the belt 21, and a suction box 31 with a suction duct 32. The cylinder 23 is also fitted with elements for elastically stressing it, for adjusting it with respect to the wall 25, and for gently braking it.

A photocell control unit 41, capable of reversing the motion of the conveyors 1 and 21 and that of the brush 9, is provided at the end of the conveyor 21 more remote from the brush 9.

Figure 6:
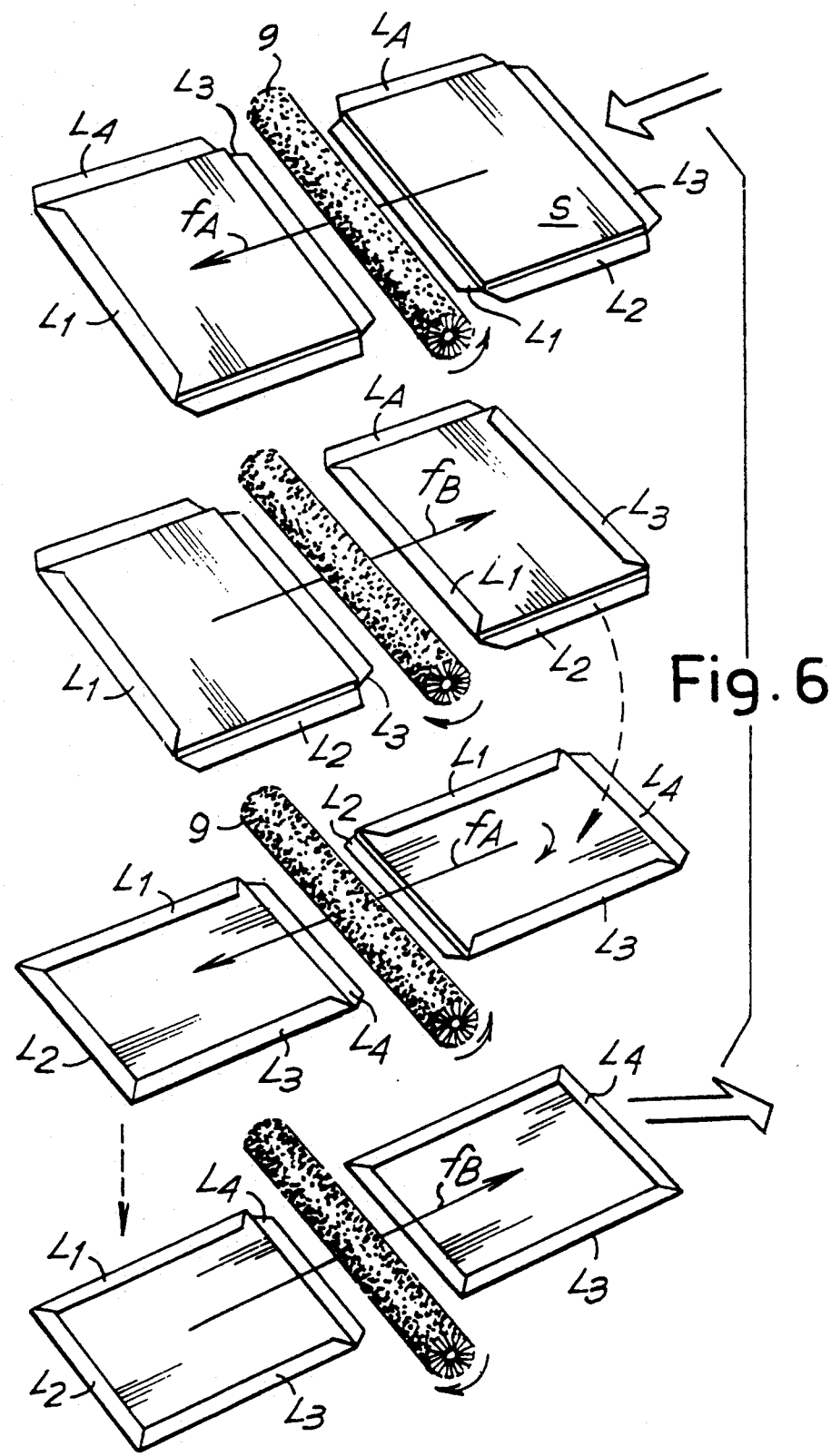
FIG. 6 shows a functional diagram.

As already stated, when the semi-finished article —made up of the paper coated with the glue to which is attached the thickness of cardboard S—is placed on the strand 1A of the conveyor belt 1, it is made to advance in the direction of the arrow fA (see also FIG. 6); the border L1 of the semi-finished article passes between the pressing and advancing elements 1A, 5 and 3 which engage and press the semi-finished article as a whole, moving it under the brush 9 which forms the folding element. The brush has its row of bristles rotating in the direction f9 so that it strikes the border L1 from below, lifting it and thus folding it along the contiguous edge of the thickness of cardboard S. This border L1 is thus folded onto the edge of the cardboard S and glued to it on the side opposite the front of the cardboard which is covered by the layer of paper. The semi-finished article passing through is pressed and advanced between the elements 23 and 25 and is gently placed on the conveyor belt 21 which is also moving in the direction fA. When the semi-finished article has passed completely beyond the pair of elements 23, 25, it reaches the photocell 41, which controls the reversal of the motion of the conveyor belts from fA to fB and of the brush 9. The article on the conveyor belt 21 is lightly held by the suction of the box 31. With the reversal controlled by the photocell 41, the semi-finished article begins to be drawn in the direction of the arrow fB so as to insert it between the elements 23 and 25 and under the brush 9 until it is made to pass again between the elements 3 and 5. This causes the border L3 to be lifted until it is folded over the contiguous bit edge of the cardboard S so as to be glued on top of it under the action of the bristles of the rotating brush 9 and of the elements 3 and 5. The semi-finished article thus appears again on the conveyor 1, 1A with the two borders L1 and L3 folded and glued.

At this point, the operator O rotates the cardboard S through 90°, replaces it on the surface 1A of the conveyor 1, and then reverses the motion once again in the direction of the arrow fA. The stopping of the conveyors and/or their restarting in the direction fA may also be performed in a more or less automated way by means of timing of the return movement and possibly also the period of stoppage for the manual rotation through 90°.

Thus the passage under the brush 9 in the two opposite directions fA and fB is repeated, on this occasion causing the two borders L3 and then L4 to be folded.

On return to the conveyor 1, this conveyor is made to continue the advance in the direction fB so as to discharge the article onto the chute 43 or another removal and/or collection system.

At this point a new cycle is initiated with another article with borders L1, L2, L3 and L4 to be folded.

It is to be understood that the drawing is only an illustration provided solely as a practical demonstration of the invention, which may be varied in its shapes and arrangements without thereby departing from the scope of the underlying concept of the invention. In particular, the suction arrangement 11, 12 and 31, 32 of the conveyors 1, 21 may be omitted.

We claim:

1. A machine for folding borders of an article, the machine comprising:
   first transport means for transporting the article;
   second transport means positioned at one end of said first transport means and for transporting the article away from, and onto said first transport means; and
   folding means positioned between said first and second transport means and for folding a first border of the article as the article is transported from said first transport means to said second transport means, said folding means also folding a second border of the article as the article is transported from said second transport means to said first transport means, said folding means including a substantially symmetrical row of bristles.

2. A machine in accordance with claim 1, further comprising:
   first pressing means at said one end of said first transport means and for pressing the article as the article moves between said first and second transport means; and
   second pressing means at an end of said second transport means adjacent said first transport means and for pressing the article as the article moves between said first and second transport means.

3. A machine in accordance with claim 1, wherein:
   said folding means is a rotor element with radial bristles.

4. A machine in accordance with claim 1, wherein:
   said folding means is a rotor element with two inclined rows of bristles.

5. A machine in accordance with claim 1, wherein:
   said first transport means includes a conveyor belt for said transporting of the article;

said first pressing means includes a pressing cylinder and a bearing wall between which said first transport means moves the article;

said second transport means includes a conveyor belt for said transporting of the article;

said second pressing means includes a pressing cylinder and a bearing wall between which said second transport means moves the article;

said first and second pressing means being positioned on substantially opposite sides of, and substantially symmetrical to said folding means; and said folding means is a rotor element with radial bristles, and each of said pressing means folding and pressing opposite borders of the article passing through in two opposite direction under said folding means.

6. A machine in accordance with claim 5, wherein:

said conveyor belts of said first and second transport means runs on said bearing walls of said respective first and second pressing means;

each of said first and second pressing means including a biasing means for biasing respective pressing rollers towards respective bearing walls, said pressing rollers being freely rotatable, said each of said pressing means also including pressing adjustment means for adjusting a minimum distance between said respective pressing roller and said respective bearing wall.

7. A machine in accordance with claim 6, wherein:

said each of said first and second pressing means includes braking means for adjustably braking said respective pressing rollers, and also including an arm supporting said respective pressing rollers and respective braking means, said each of said first and second pressing means also includes bristle position adjustment means for adjusting a position of said respective pressing roller with respect to said folding means.

8. A machine in accordance with claim 7, wherein:

said bristle rotor is positioned in contact with said conveyor belts at said ends of said first and second transport means.

9. A machine in accordance with claim 1, further comprising:

sensor means for sensing when the article has reached another end of said second transport means and for controlling a transport direction of said first and second transport means to reverse direction when the article has reached said another end of said second transport means.

10. A machine in accordance with claim 1, further comprising:

control means for controlling said first and second transport means to control timing and direction of said transporting of the article.

11. A machine in accordance with claim 1, wherein:

said first and second transport means transport the article along substantially similar planes.

* * * * *